Figure 1:

May 12, 1959   M. VAN LOO ET AL   2,886,456
METHOD FOR PRESERVING GLOSS IN PAINT FILM
Filed March 8, 1957   4 Sheets-Sheet 1

Inventor
MAURICE VAN LOO
VERNER W. BITTER
By Robert A. Sturges
Attorney

Inventors
MAURICE VAN LOO
VERNER W. BITTER

Contact Angle: House Paint

May 12, 1959  M. VAN LOO ET AL  2,886,456
METHOD FOR PRESERVING GLOSS IN PAINT FILM
Filed March 8, 1957  4 Sheets-Sheet 4

MAURICE VAN LOO
VERNER W. BITTER
INVENTORS

BY
Robert A. Sturges

United States Patent Office 2,886,456
Patented May 12, 1959

2,886,456
METHOD FOR PRESERVING GLOSS IN PAINT FILM

Maurice Van Loo, Chicago, Ill., and Verner W. Bitter, Winlock, Wash., assignors to The Sherwin-Williams Company, Cleveland, Ohio, a corporation of Ohio Application March 8, 1957, Serial No. 644,909

11 Claims. (Cl. 106—252)

This invention relates as indicated to a novel method for treating coating compositions of the normally glossy type so as to prevent substantial loss of gloss during the drying stage. More particularly, this invention contemplates the addition to glossy formulations of paints, varnishes, lacquers, enamels and the like of a controlled amount of a sulpho-succinate to prevent flatting of a freshly laid down paint film by moisture from the ambient atmosphere.

A relatively common complaint on glossy house paints, for example, is that instead of drying to the normal desired gloss, they dried flat. Heretofore this has been thought to be a "fine surface wrinkle." This difficulty has been the basis for the recommendation against painting too late in the day, at which time moisture may condense on the film from the atmosphere before it is dry. It has been recognized that drying conditions play an important role in gloss development and condensed water in the form of dew will cause flatting. It has not been previously recognized, however, that there is a definite critical period during the drying of all clear or pigmented air-drying films in which they are all vulnerable to moisture, nor has there ever been suggested a way to avoid this trouble.

When paint films are exposed to water either in the form of condensed water as from dew or fog, or by direct impingement as from drizzle or rain, there may or may not be permanent distortion of the film surface so that the dried films have less gloss than normal. For example, a freshly deposited film of exterior house paint may be applied in the rain and yet dry to a normal gloss if the atmospheric conditions are right at the critical period in drying. Contrariwise, the paint film may be deposited in bright sun-light and yet dry without substantial gloss if the drying conditions at the critical period are conducive to such result. It has been found that paint films are most vulnerable to permanent distortion by water when the film is starting to set up and may continue beyond the "set-to-touch" stage for some length of time, depending upon the drying characteristics of the film. It has been observed that when paint films enter into this vulnerable drying period and are exposed to water, the water collects as closely packed droplets on the film. Various physical forces, including the surface tension of the moisture droplet, the hydrophilic nature of the paint film at this particular stage of its drying, van der Waals forces, mutual attraction between two bodies, etc. and in certain cases, gravitational forces are sufficient to cause a slight displacement of the coating and effect a surface distortion. Thereafter, the film "sets" in the deformed state before the water droplets have evaporated and the distortion then becomes permanent. It is the surface distortion heretofore thought to be a fine wrinkle that decreases the gloss.

Figure 2:
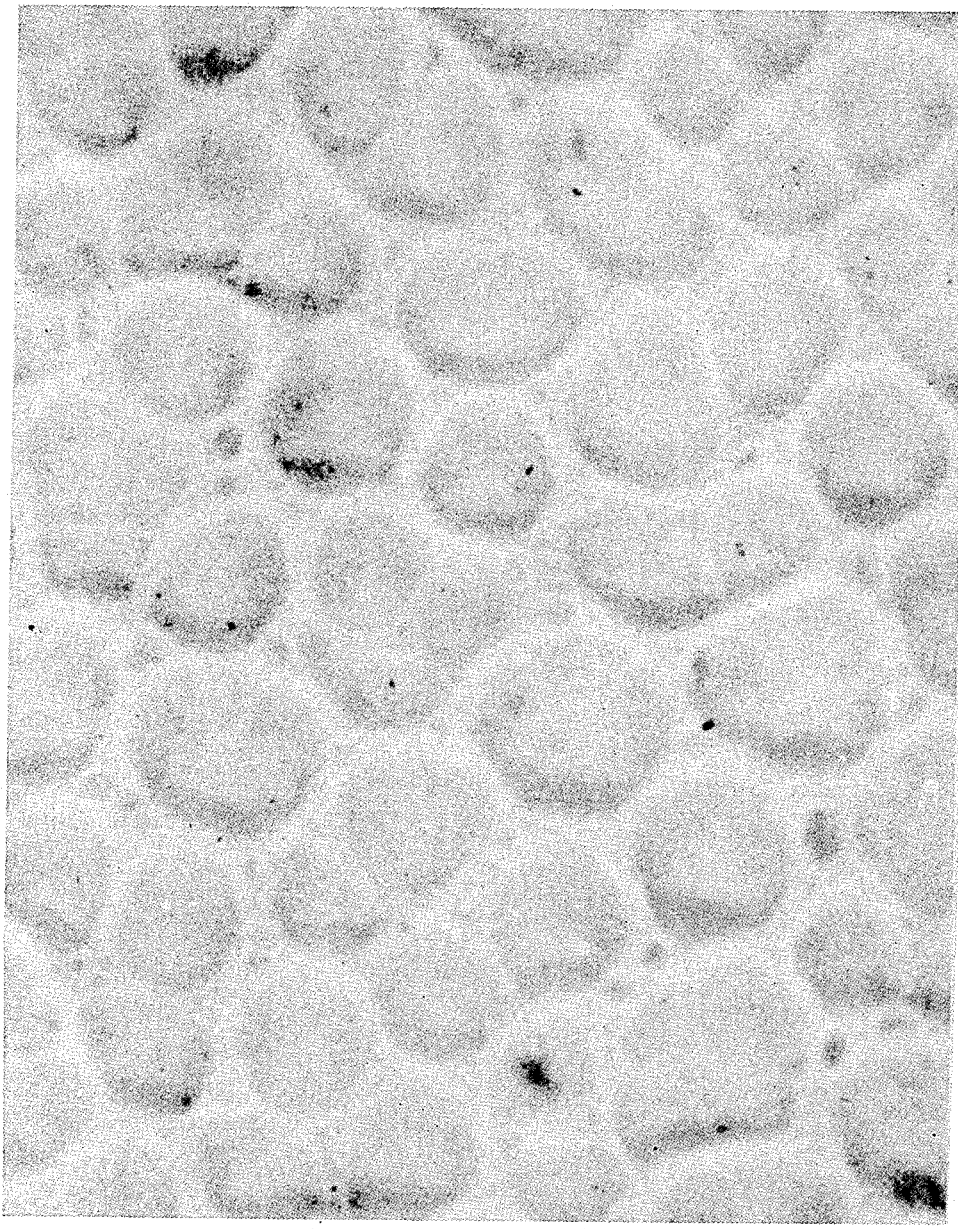

Reference may be had to Figs. 1 and 2 in the annexed drawing, which are reproductions of photomicrographs of paint films having the water droplets accumulated on the surface thereof (Fig. 1) and Fig. 2, showing a dried film in which flatting is observed. The craters are clearly shown in Fig. 2.

After it was discovered that the reason the films were flat was the surface distortion in the form of craters, it then became imperative to determine when in the drying period this damage occurred.

It has been observed during film drying tests that the film passes though a cycle of hydrophilic-hydrophobic-hydrophilic characteristics. In other words, films were rather easily wet initially, then became quite water repellent and then finally were able to maintain a more continuous water film. It was then decided to study with considerable care what happened when successive water droplets were allowed to fall on a paint film at intervals throughout the drying cycle.

Figure 3:
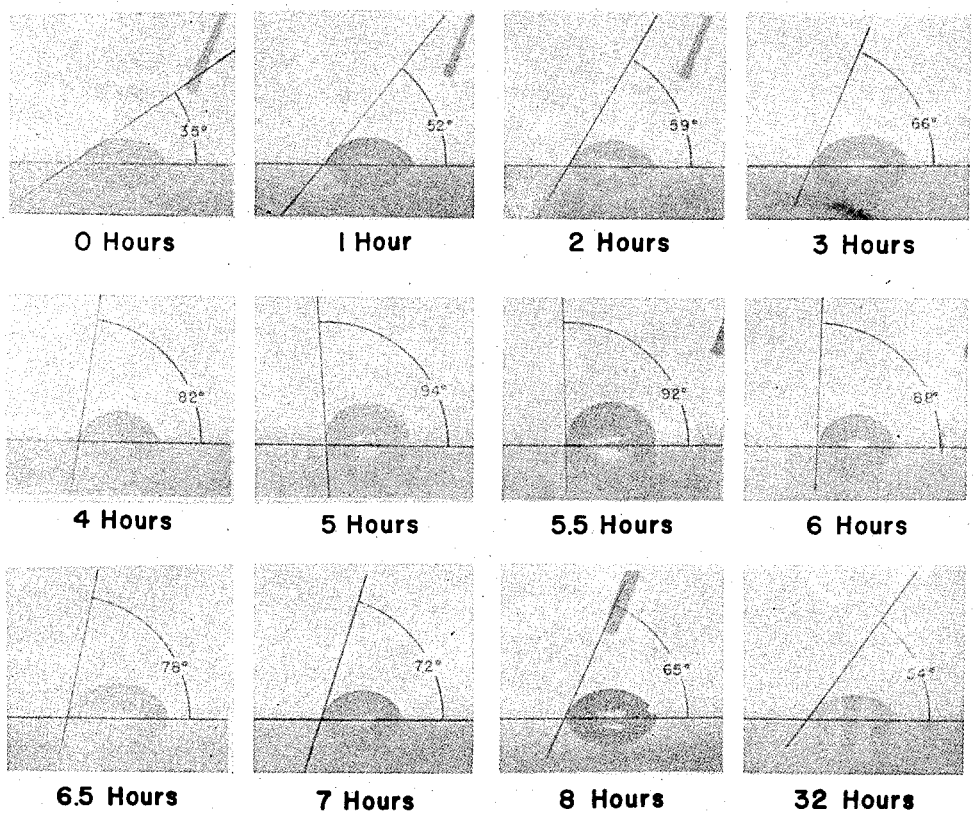

Fig. 3 shows a series of photographs of a series of water droplets applied to and resting upon the surface of paint film at various stages in its drying, progressing from freshly laid down film to one fully dried. Superimposed upon these photographs are the tangent lines from which measurement of the contact angle can be made. The apparent elliptical form of the droplet is caused by the reflection of the droplet by the surface of the paint film. The base lines represent the surface.

Fig. 3 is self-explanatory and shows the very marked changes that occur in the contact angle in a period of 32 hours of drying. In the case of the house paint shown in Fig. 3, it will be observed that the contact angle reaches its maximum in 5 hours and then begins to diminish. It is at the point where the contact angle is at a maximum that the greatest degree of permanent damage to the pain film will be observed. This corresponds roughly to the "set-to-touch" time. If moisture condenses on or comes into contact with the film of paint in the early stages of drying, it will form a continuous film of water on the surface due to the low interfacial tension or contact angle. The weight of the water is distributed uniformly so that there is no film distortion. Even if there were, the paint film still has enough plastic flow that any temporary deformations would tend to level out upon evaporation of the water.

As the drying continues, the interfacial tension increases and reaches a point where the water droplet no longer wets the paint films or forms a continuous water film. As the contact angle increases further, the water now forms separate drops each subject to the forces above mentioned. The surface is deformed and if the paint film has dried to a point where there is no longer sufficient plastic flow to level out the craters when the water is removed as by evaporation, the distortion becomes permanent and the gloss is reduced by the surface irregularities.

When the film dries even further, the water contact angle again decreases. Condensed water then tends to spread out, eventually forming a continuous film. The film by this time has gained considerable resistance to distortion and therefore there will be no flatting.

The stages through which the drying film passes, then, may be defined in the relative terms "hydrophilic-hydrophobic-hydrophilic." The solution to the problem is in eliminating the middle stage and rendering the film relatively hydrophilic throughout the entire drying stage. If any water forms or collects or falls on the surface of the drying film, it will then spread out in a uniform layer instead of minute individual droplets. There will then be no surface distortion with its harmful effect on gloss.

It has been found that agents are available and usable in a wide variety of clear and pigmented coatings. They reduce the interfacial tension between the coating and the water to a point where any water spreads evenly during all stages of drying. Under the same conditions where an untreated paint will demonstrate flatting, as from dew, the same paint treated with a certain amount of a sulpho-succinate of the type hereinafter described, for example, will dry without loss of gloss.

The sulpho-succinates are one group of wetting agents which have been found useful in treating glossy paints to obviate the difficulty of flatting. These materials have the general formula:

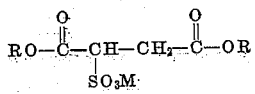

wherein R is an alkyl group containing from 5 to 14 carbon atoms, and M is an alkali metal, for example, sodium, potassium or lithium, or ammonium.

Specific examples of sulphonates of succinic acid esters, therefore, include the following compounds: diamyl sodium sulpho-succinate, di-hexyl sodium supho-succinate, di-cyclohexyl sodium sulpho-succinate, di-(methyl cyclohexyl) sodium sulpho-succinate, di-heptyl potassium sulpho-succinate, di-(n-octyl) sodium sulpho-succinate, di-(n-octyl) potassium sulpho-succinate, di-(n-octyl) lithium sulpho-succinate, di-(2-ethyl hexyl) sodium sulpho-succinate, di-capryl sodium sulpho-succinate, di-nonyl sodium sulpho-succinate, di-decyl sodium sulpho-succinate, di-(3,7-dimethyl octyl) sodium sulpho-succinate, di-(4-amyl cyclohexyl) sodium sulpho-succinate, di-(4-isohexyl hexahydrobenzyl) sodium sulpho-succinate, di-dodecyl potassium sulpho-succinate, di-lauryl ammonium sulpho-succinate.

The above examples of sulpho-succinates are among those which have been found useful in the method of this invention, and are, in general, the water-soluble sulphonates of di-esters of succinic acid. While all water-soluble sulpho-succinate di-esters are useful herein, the aliphatic and cycloaliphatic di-esters are preferred, and best results are obtained with those aliphatic di-esters containing from 5 to 15 carbon atoms in the aliphatic group. For the purposes of this invention, cycloaliphatic radicles are regarded as encompassed in the broader term "aliphatic."

The amount of sulpho-succinate used in the coating compositions in accordance with the process of this invention is critical. ¼% by weight or less based on the weight of the coating composition to be treated is insufficient to give the protection necessary. The minimum amount which has been found by prolonged study is 0.5% by weight plus or minus a few 100ths of a percent. The maximum amount which can be tolerated without destruction of desirable film characteristics, e.g., water insensitivity, is about 1.75%.

A convenient method for defining the coating compositions in which improvement can be effected by the method of this invention is in terms of the pigment volume concentration and the critical pigment volume concentration. The concepts of PVC and CPVC are carefully explained in the article entitled "Critical Pigment Volume Relationships" by W. K. Asbeck and Maurice Van Loo, Industrial & Engineering Chemistry, vol. 41, page 1470, July 1949. An apparatus suitable for use in determining the CPVC of a system is described and claimed in the patent to W. K. Asbeck, 2,751,782. In general, a glossy system exists when the PVC is less than the CPVC. In other words, the amount of pigment in relation to the amount of pigment plus binder is such that there is an excess of binder over that which would be required to satisfy the binder requirements of the individual particles to produce a continuous film. Thus, these terms are not limited to any particular binder system, that is, the systems contemplated by this invention include any of the ordinary coatings vehicle systems, such as, oil-modified alkyds, for example, a linseed oil modified glyceryl phthalate resin, the styrenated oils and alkyds, or a straight vegetable oil binder, e.g., linseed oil, dehydrated castor oil, tung oil, etc., or a lacquer system utilizing nitrocellulose as the principal binder material. In any of these systems where the PVC is less than the CPVC, the film will be glossy providing, of course, other surface disturbing factors are not present, as for example, in wrinkle finishes. Of course, the gloss of even a wrinkling finish can be further cut by the phenomena herein described and hence there is advantage to be gained even in the case of wrinkling coating compositions by the method of this invention. The results are not, however, so pronounced.

Figure 4:
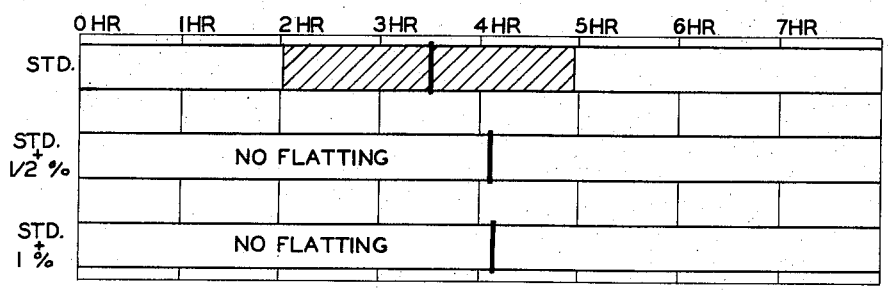

Referring now to the drawings, Fig. 4 is a series of bar graphs representing three tests on a particular paint system. The bar graphs represent drying time, the regular intervals representing hours. The shaded area represents the period during which exposure to condensable moisture will cause flatting in the dried film. The heavy vertical line in each of the bar graphs indicates the "set-to-touch" time for the particular composition under consideration. The uppermost bar graph in each of these series represents a standard untreated coating composition. The succeeding bar graphs represent the same coating composition treated with the indicated percentages of a sulpho-succinate. If there is no shaded area in a given example, then no flatting is observed.

The laboratory procedure by which the bar graphs were obtained was as follows.

Example 1

The equipment consisted of a microscope, an aluminum panel, and a rubber hollow tube. The test film of paint was drawn down upon the aluminum panel at a thickness of 0.005 inch. Utilizing as an example a film of blown linseed oil plus driers, the following example will serve to illustrate the procedure employed in all cases. The clear blown linseed oil varnish and drier composition was drawn down upon the aluminum panel and allowed to partially dry under normal conditions of temperature and humidity. 1.5 hours after drawing down the film, the panel was placed on a base plate previously cooled in a deep freeze and the operator breathed through the tube onto a portion of the cold film. This caused an immediate fogging. After application of the moisture, there was almost immediate recovery. There was no evidence of film distortion.

The procedure was repeated at the end of 2 hours and the recovery was the same as before, the film continuing its drying under normal conditions.

The 2.5 hour exposure produced a very definite fogged area on the portion exposed to breath. Small diamond-like droplets were observed through the microscope. There was a complete recovery after 4 minutes air-drying. These diamond shaped droplets evaporated, leaving no permanent film distortion.

The three hour exposure to breath produced the characteristic film pattern. A small pin-point wrinkle and cell pattern was set up. However, the film recovered completely. At the 3.5 hour exposure, the set-to-touch time was reached. In this particular case, at the set-to-touch time, the operators saw the actual phenomena of flatting occurring. The water droplets were formed and later evaporated, leaving behind the characteristic indentations or craters which produced the flatting.

The 5th hour exposure again produced a continuous sheath of moisture and no film of distortion was produced.

Two additional oils, namely, raw linseed and heat bodied linseed oil, performed in a similar manner.

Example 2

Following the same procedure as set forth in Example 1, above, and taking readings every 30 minutes, the bar graph illustrated in Fig. 4 was obtained. The coating composition utilized for the three tests represented in Fig. 4 was as follows:

| | Pounds |
|---|---|
| Linseed-soya pentaerythritol phthalate | 258 |
| Linseed-soya glyceryl phthalate | 257 |
| Lead naphthenate (10%) | 38 |
| Manganese naphthenate (0.2%) | 7 |
| Calcium naphthenate (4%) | 4 |
| Toluidene red (light) | 100 |
| Fumed litharge | 12 |
| Mineral spirits | 126 |
| Ethyl alcohol (anhydrous) | 2.5 |
| Methyl ethyl ketoxime | 2 |
| Phenyl mercuric oleate | 4 |

A paint having the foregoing formulation was tested at the following concentrations:
0% di-octyl sodium sulpho-succinate
.5% di-octyl sodium sulpho-succinate
1% di-octyl sodium sulpho-succinate
(Percentages are by weight)

As will be observed from the bar graph Fig. 4, the period during which flatting is observed in the final film is between 2 and 5 hours after application and exposure to air. The set-to-touch time for the standard is 3.5 hours. At the .5 and 1% concentrations of the di-octyl sodium sulpho-succinate, no flatting was observed. It is interesting to note that the set-to-touch time has been advanced about 30 minutes in each case.

*Example 3*

Following the same procedure as given in Examples 1 and 2 above, the following coating composition was similarly treated and tested:

| | Pounds |
|---|---|
| Water ground mica | 65 |
| Talc | 172 |
| Reduced titanium dioxide | 175 |
| Anatase titanium dioxide | 100 |
| Leaded zinc oxide | 345 |
| Bodied linseed oil | 182 |
| Raw linseed oil | 248 |
| Lead naphthenate (10%) | 13 |
| Manganese linoleate (2%) | 4 |
| Mineral spirits | 112 |

Figure 5:
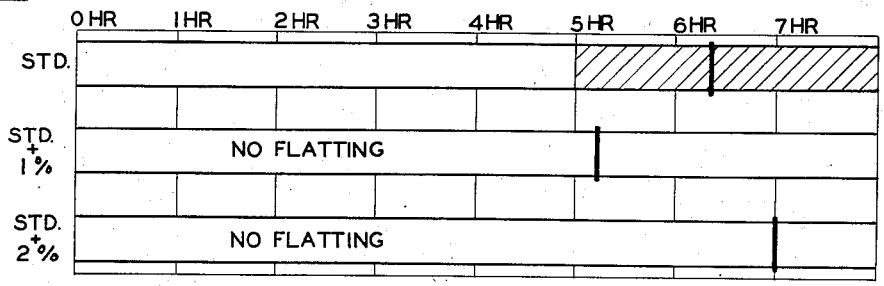

Referring now to Fig. 5, the bar graphs show the results at the following concentrations of di-octyl sodium sulpho-succinate: 0%, 1% and 2%. With the standard or blank sample, the material showed sensitivity to moisture between 5 and 8.5 hours. The set-to-touch time was 6.5 hours. At both the 1% and 2% concentrations of the sulpho-succinate, no flatting was observed. The set-to-touch time was slightly over 5 hours in the 1% addition and slightly under 7 hours at the 2% addition.

*Example 4*

The series of Example 3 above was repeated changing the di-octyl sodium sulpho-succinate to the dihexyl sodium sulpho-succinate. The results obtained in this case were substantially the same as with the di-octyl derivative.

*Example 5*

Figure 6:
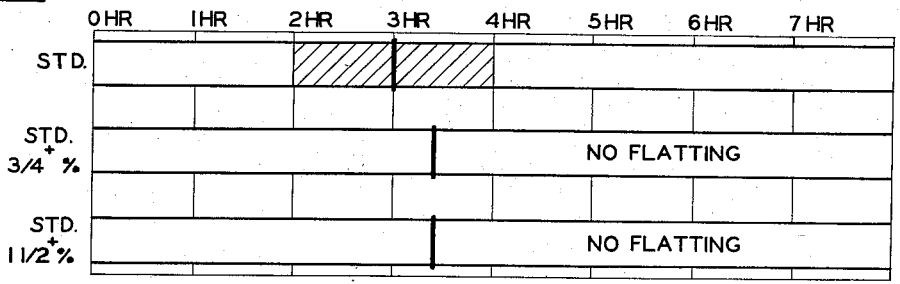

The bar graphs of Fig. 6 were obtained utilizing a composition having the following formulation:

| | Pounds |
|---|---|
| Ferric ferrocyanide | 100 |
| Rutile titanium dioxide | 32 |
| Talc | 40 |
| Litharge | 6 |
| Linseed soya glyceryl phthalate | 440 |
| Linseed soya pentaerythritol phthalate | 95 |
| Mineral spirits | 137 |
| Calcium naphthenate (4%) | 4 |
| Lead naphthenate (10%) | 30 |
| Manganese naphthenate (2%) | 7 |
| Cobalt (2%) | 3.5 |

This composition was tested as a blank, with a 0.75% di-octyl sodium sulpho-succinate and 1.5% of the same agent. It will be observed from the bar graphs that the standard was subject to flatting between the second and fourth hour after application upon air drying. The set-to-touch time was three hours. When the coating composition had been modified with the sulpho-succinate, no flatting was observed. In each case the set-to-touch time advanced by 30 minutes.

*Example 6*

The coating composition of Example 5 above was again tested with similar amounts of di-(cyclohexyl) sodium sulphosuccinate in the amounts of 0.5, 1.0, 1.5 and 2% by weight. In this case the set-to-touch time advanced 30 minutes for each addition over the standard. No flatting was observed during any portion of the drying period although at the higher concentration, the dried film showed a slight water sensitivity.

*Example 7*

Figure 7:
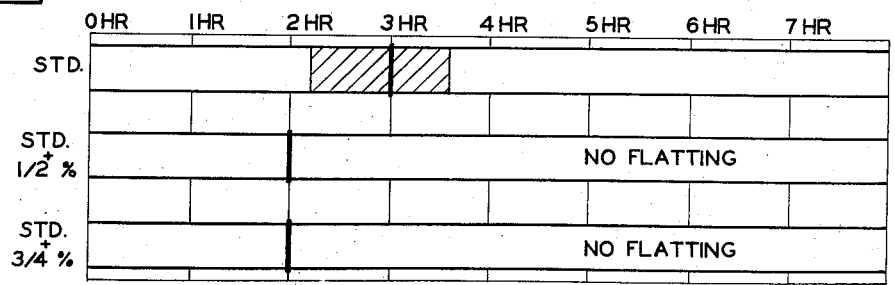

The bar graphs of Fig. 7 were obtained using the following paint formulation. This composition is an enamel.

| | Pounds |
|---|---|
| Calcium stearate | 3 |
| Rutile titanium dioxide | 285 |
| Reduced titanium dioxide | 55 |
| Soya glyceryl phthalate | 328 |
| Soya pentaerythritol phthalate | 219 |
| Mineral spirits | 124 |
| Calcium octoate (4%) | 15 |
| Cobalt octoate (6%) | 4 |
| Soya lecithin | 4 |
| Methyl ethyl ketoxime | 3.5 |

As shown in the bar graphs of Fig. 7, the standard shows sensitivity to moisture in the period of 2.25 hours and 3.5 hours after application. The set-to-touch time for the standard is 3 hours. With the addition of .5% di-octyl sodium sulpho-succinate and 75% of the same material, no flatting is observed at any point during the drying time and the set-to-touch time is advanced to 2 hours.

*Example 8*

The coating composition used in Example 7 above was retreated and tested with .5% and 1% weight of di-(4-isoamyl hexahydrobenzyl) sodium sulpho-succinate. No flatting was observed during the drying period when the wet film was exposed to moisture.

*Example 9*

As an example of the application of this invention to a lacquer, the following lacquer composition was tested in the same manner as given for the previous examples:

| | Pounds |
|---|---|
| Carbon black | 105 |
| Nitrocellulose (¼ second) | 125 |
| Maleic rosin ester (7% maleic anhydride on the rosin esterified with pentaerythritol) | 40 |
| Tricresyl phosphate | 10 |
| Dibutyl phthalate | 20 |
| Blown castor oil | 35 |
| Methyl amyl acetate | 25 |
| Isopropyl acetate | 110 |
| Butyl alcohol | 30 |
| Ethyl alcohol (anhydrous) | 10 |
| Isopropyl alcohol | 40 |
| Commercial octane | 60 |
| Toluene | 115 |
| n-Propyl acetate | 75 |

The foregoing black lacquer is a very fast drying composition and the observations made in the manner of the previous examples had to be made very rapidly in order to detect the time when the film was permanently affected by condensed moisture. A composition corresponding to that given above when treated with .5% by weight of dioctyl sodium sulpho-succinate showed no tendency to flatting during the entire drying cycle. The untreated composition showed a period during the drying time in which the film was sensitive to moisture.

The foregoing examples are all based upon anhydrous coating compositions. The additions of the sulpho-succinate are made by simple addition to the previously mixed paint. The addition may be made at any time while the coating composition is in the fluid state. This is true even after the coating composition has been applied to a surface. A solution of the sulpho-succinate in water may be sprayed upon the freshly painted out surface to prevent the problem of flatting.

It has been observed that the sulpho-succinates are quite unique for the purposes of this invention. The non-ionic wetting agents do not appear to give the desired results. Only certain of the cationics and the anionics appear to have this desired effect. Among the cationics the sulpho-succinates as a class appear to be the most effective.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. The method of preventing flatting of partially dry glossy air drying essentially anhydrous solid film-forming coatings by droplets of water condensed from the ambient atmosphere comprising adding to an air drying anhydrous coating composition having a PVC less than the CPVC for the system from about 0.5% to about 2% by weight of the coating composition of a water-soluble sulphonate of di-saturated aliphatic hydrocarbon ester of succinic acid in which the aliphatic group contains from 5 to 15 carbon atoms.

2. A method in accordance with claim 1 in which the di-ester is a cycloaliphatic hydrocarbon di-ester.

3. A method in accordance with claim 1 in which the di-ester is an alkyl di-ester.

4. A method in accordance with claim 1 in which the sulphonate is an alkali metal sulphonate.

5. A method in accordance with claim 4 in which the alkali metal is sodium.

6. A method in accordance with claim 5 in which the alkali metal is potassium.

7. A method of preventing flatting of partially dry glossy air-drying, essentially anhydrous solid film-forming coatings by droplets of water condensed from the ambient atmosphere comprising adding to an air drying anhydrous coating composition having a PVC less than the CPVC for the system from about 0.5% to about 2% by weight of the coating composition of the sodium sulphonate of a dialkyl ester of succinic acid in which the alkyl group contains from 5 to 15 carbon atoms.

8. A method in accordance with claim 7 in which the dialkyl ester is the di-octyl ester.

9. A method in accordance with claim 7 in which the dialkyl ester is the di-(2-ethyl hexyl) ester.

10. A method in accordance with claim 7 in which the dialkyl ester is the di-(3,7-dimethyl octyl) ester.

11. A method in accordance with claim 7 in which the dialkyl ester is the dihexyl ester.

References Cited in the file of this patent

UNITED STATES PATENTS

| | | |
|---|---|---|
| 2,316,234 | Flett | Apr. 13, 1943 |
| 2,381,915 | Lent | Aug. 14, 1945 |
| 2,418,453 | Auer | Apr. 8, 1947 |
| 2,441,341 | Vitralis | May 11, 1948 |
| 2,530,370 | Auer | Nov. 21, 1950 |
| 2,675,320 | Christopher et al. | Apr. 13, 1954 |

OTHER REFERENCES

Von Fischer: "Paint and Varnish Technology" (1948), pp. 295–301.